United States Patent [19]

Jackson

[11] Patent Number: 4,806,243

[45] Date of Patent: Feb. 21, 1989

[54] SELF-CLEANING FILTER AND STEAM CONDENSER INLET WATER BOX COMPRISING SAME

[75] Inventor: Philip Jackson, Paris, France

[73] Assignee: E. Beuadrey & Cie, Paris, France

[21] Appl. No.: 10,681

[22] Filed: Feb. 4, 1987

[30] Foreign Application Priority Data

Feb. 11, 1986 [FR] France ............................... 86 01820

[51] Int. Cl.[4] ............................................ B01D 29/04

[52] U.S. Cl. .................................... 210/303; 210/305; 210/315; 210/338; 210/342; 210/422; 210/497.3; 210/499

[58] Field of Search ............... 210/303, 304, 305, 315, 210/316, 338, 342, 420, 422, 488, 497.01, 497.3, 499, 450, 447; 55/288, 482, 483

[56] References Cited

U.S. PATENT DOCUMENTS 2,730,242 1/1956 Samuel ............................... 210/199
3,280,982 10/1966 Barto .................................. 210/315
4,565,631 1/1986 Bitzer et al. ...................... 210/333.1
4,582,605 4/1986 Rea et al. .......................... 210/450

FOREIGN PATENT DOCUMENTS 3332511 3/1985 Fed. Rep. of Germany .
1256357 2/1961 France .
564638 7/1975 Switzerland .
1516732 7/1978 United Kingdom .

*Primary Examiner*—Benoit Castel
*Assistant Examiner*—Richard D. Jordan
*Attorney, Agent, or Firm*—Charles E. Brown; Charles A. Brown

[57] ABSTRACT

A filter comprises a screen having a substantially conical inner wall disposed axially at its center. There is a collection space at the larger diameter end of this inner wall. A frustoconical outer wall surrounds the inner wall and has its smaller diameter end connected to the collection space. At least one offtake conduit is connected to the collection space.

20 Claims, 2 Drawing Sheets

28 28 B 27 C 36 31 37 37 29 25 26 30 C B 35 32 D 43 A 33

52
52
12
28
11
27
36
31
30
25
18
10
14
41
37
26
40
37
37
40
41
17
16
33
22
21
29
43
35
32
F
F
23
20
15
13
III
III

D
37
A
26
37
37
43
33
29
C
30
37
B
25

SELF-CLEANING FILTER AND STEAM CONDENSER INLET WATER BOX COMPRISING SAME

BACKGROUND OF THE INVENTION

1. Field of the Invention

The present invention is generally concerned with filters used to clean a liquid circulating in a network under pressure and likely to entrain debris, detritus or foreign bodies.

It is more particularly directed to treatment of industrial process water which may contain man-made debris or detritus and/or vegetable debris or detritus, such as algae, for example, or animals such as mussels, shellfish or fish liable to proliferate on the downstream side unless previously separated out.

More specifically still, the invention concerns steam condensers.

2. Description of the Prior Art

Filters used to clean industrial process water usually comprise a filter body to which is connected a screen, that is to say a filter element that may comprise a screen of perforated sheet metal or filter fabric, or a screen formed by an array of parallel blades or filaments carried by transverse support bars, the screen being designed to be inserted into the flow to be treated.

In the specific case of self-cleaning filters means are provided for systematically evacuating debris, detritus and foreign bodies held back by the screen.

Thus in known implementations, which have the considerable advantage of comprising no moving parts, such evacuation results from design features which cause the incoming flow to sweep across the screen.

For example, in a first type of implementation of such self-cleaning filters without moving parts the arrangement is such that the speed vector of the incoming flow is oblique to the surface of the screen and thus has not only a component perpendicular to the latter, necessary to have the flow pass through the screen, but also a tangential component; by virtue of this latter component any debris, detritus and foreign bodies held back by the screen are systematically and continuously entrained towards a collecion space provided for this purpose.

In this first type of implementation of self-cleaning filters using no moving parts the filter body is in practise disposed around the screen in the manner of a spiral staircase, the flow to be filtered entering the filter body tangentially and the treated flow leaving it axially.

Although giving satisfaction, the corresponding implementations are for the most part somewhat bulky and since they change the orientation of the flow to be treated, which also and inevitably results in head losses on the downstream side, they can be difficult to install, especially in existing installations, and so are not suitable for all applications.

The existing installation must have either sections of conduit at right angles to each other or sufficient space for such sections of conduit to be installed.

In a second type of implementation of self-cleaning filters using no moving parts the filter body is adapted to be inserted in the flow direction in the conduit carrying the fluid to be treated, the corresponding screen then having a generally conical filter wall which has its larger diameter end, the upstream end, at least partially fitted within the filter body, there being in the filter body and around the larger diameter end of the screen a transverse volute-form collection space to which is connected an offtake conduit for evacuating debris, detritus and other foreign bodies held back by the screen.

However, in this second type of self-cleaning filter with no moving parts the screen is in practise cleaned only during periodic purges, the feed water for such purging then causing the incoming flow to rotate to bring about the necessary cleaning action; these periodic purges, which are diverted to the drainage system, mobilize quantities of water prejudicial to a regular feed to the downstream installation, all the more so in that all of the surface of the screen has to be cleaned simultaneously.

In such implementations it is currently necessary, to ensure an acceptable ratio between the filter surface area of the screen and the cross-section of the conduit into which it is inserted, for the length or height of the screen along the axis of the conduit to be very much greater than, in practice, twice the diameter of the conduit; once again this makes the possibility of installing such filters somewhat random, especially in existing installations, where there are rarely sufficient lengths of conduit between two bends.

In the specific case of a steam condenser the use of this second type of self-cleaning filter using no moving parts can also cause difficulties, especially where the filters have to be installed in the immediate vicinity of the inlet water box of the steam condenser.

It is then necessary to have, between the tube that a water box usually incorporates for connecting it to the conduit which serves it, on the one hand, and the conduit is itself, on the other hand, sufficient space for inserting the corresponding filter body.

A general object of the present invention is an arrangement which, for a self-cleaning filter without moving parts adapted to be inserted in the flow direction into a conduit, advantageously makes it possible to minimize the overall length of the filter along the axis of the conduit whilst providing an acceptable ratio between the filter surface area provided and the cross-section of the conduit, and whilst also procuring at all points on the screen an angle of incidence relative to its surface of the speed vector of the flow to be treated adapted to procure systematic entrainment towards a collection space of debris, detritus or foreign bodies held back by the screen.

SUMMARY OF THE INVENTION

In one aspect, the present invention consists in a filter comprising a screen having a substantially conical inner wall disposed axially at its center, a collection space at the larger diameter end of said inner wall, a frustoconical outer wall surrounding said inner wall and having its smaller diameter end connected to said collection space, and at least one offtake conduit connected to said collection space.

In another aspect the invention consists in a steam condenser inlet water box comprising a tube through which it is adapted to be coupled to a feed conduit and, in said tube, a filter as defined in the preceding paragraph.

In practise, the overall configuration of the screen of the filter in accordance with the invention is that of a finger of a glove the blind end of which has been pushed back inside the main part.

As a result, it has a large filter surface area for a relatively small axial length or height.

This makes it easier to install the filter in accordance with the invention.

Installation is made even simpler by the fact that there is no filter body proper, the collection space associated with the screen being disposed, not peripherally at the outside of the assembly in the usual way, but in a central annular area where, according to one characteristic feature of the invention, it actually lies in the flow of fluid.

Thus the axial dimension of the filter in accordance with the invention external to the existing plant is in practise reduced to the thickness of a flange projecting radially away from its axis at the larger diameter end of the outer filter wall of the screen, this flange being adapted to be inserted between two flanges of the plant equipped with the filter, in order to hold the screen in position; in the particular case of a steam condenser, this flange is disposed between the connecting flange of the tube of the input water box of the steam condenser, on the one hand, and the corresponding connecting flange of the conduit feeding the water box, on the other hand.

The screen of the filter in accordance with the invention and the associated collection space are then quite naturally housed in the tube of the water box, extending into this axially from its connecting flange.

The screen of the filter in accordance with the invention is preferably circumferentially subdivided to form a plurality of sectors by baffles, for example four baffles in a cruciform configuration, extending radially from the axis of the the screen to its periphery and passing through the inner filter wall and the outer filter wall, so that they also form a support framework for the screen.

This advantageously facilitates construction, the inner and outer filter walls of the screen then being reduced to filter panels which, appropriately curved, each extend from one of these baffles to another, being appropriately attached to each of them, as by welding, for example.

According to a further development of this arrangement, the baffles thus forming a support framework for the screen of the filter in accordance with the invention advantageously extend axially beyond the screen into the associated collection space so that, like the screen, the collection space is itself subdivided to form a plurality of sectors, with a separate offtake conduit for each sector.

In this way it is possible to reduce significantly the flowrate of the purges needed for periodic removal of debris, detritus or foreign bodies removed from the flow of fluid concerned, favoring a regular feed to the downstream installation.

Such periodic purging may then be applied in sequence to the individual collection spaces, requiring in each case only a fraction of the flowrate that would otherwise be necessary for the collection space as a whole.

Because the speed vector of the flow to be treated is oblique both to the outside filter wall of the screen of the filter in accordance with the invention and to its inside filter wall, that is to say because this speed vector is at a low angle of incidence to the surface of these filter walls, and because of the surface turbulence that arises on passing through these walls, systematic entrainment towards the corresponding collection spaces of debris, detritus or foreign bodies held back by the filter walls is favored, so that the period purges to be carried out mainly serve to remove from the collection spaces the debris, detritus or foreign bodies previously collected in them, without it being necessary to develop simultaneously about these filter walls any rotation to bring such collection about.

Thus the flowrate used for the periodic purges is advantageously even further reduced.

The characteristics and advantages of the invention will emerge from the following description given by way of example and with reference to the appended schematic drawings.

DESCRIPTION OF THE PREFERRED EMBODIMENT

The figures show by way of example the application of the invention to the feed to a steam condenser 10, an application for which the invention is more particularly, but not necessary exclusively, intended.

As a steam condenser 10 of this kind is well known in itself and does not of itself form part of the present invention it will not be described in complete detail here.

Figure 1:
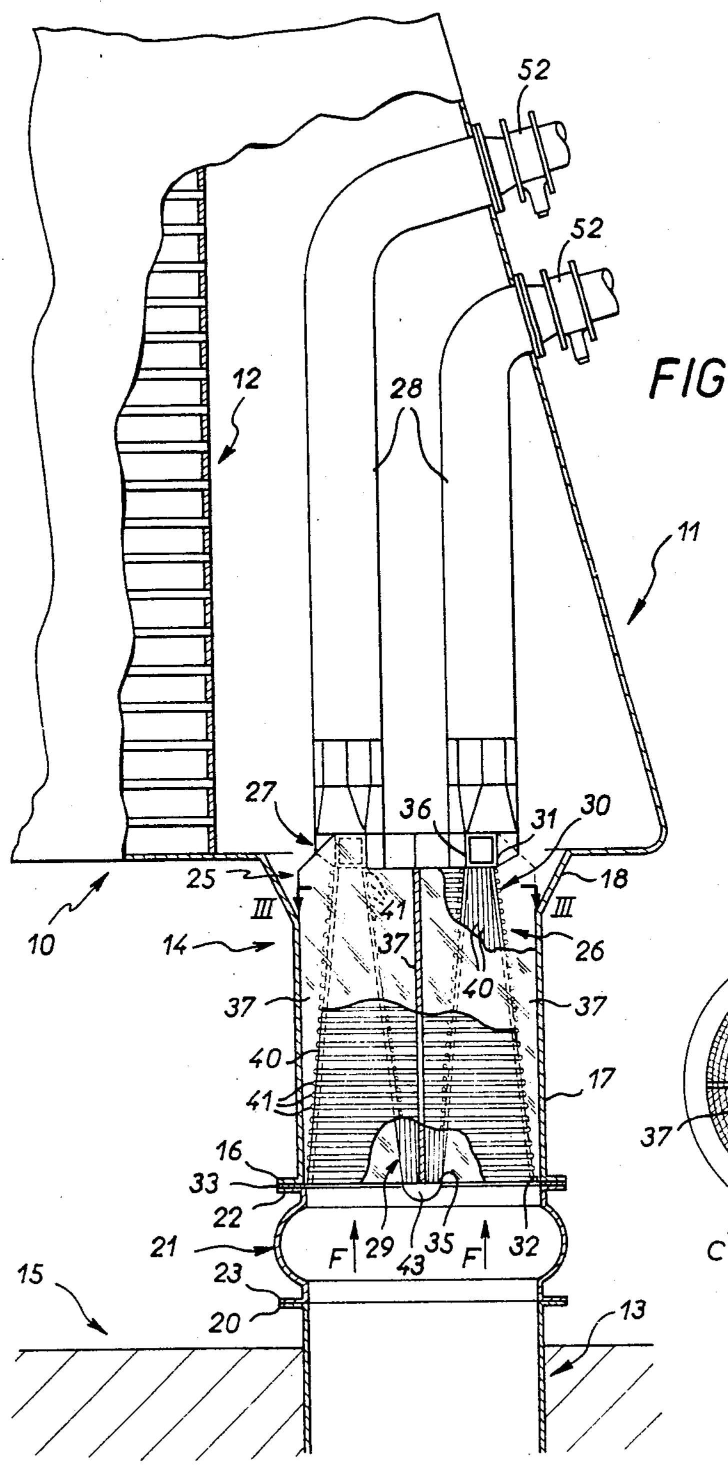
FIG. 1 is a locally cut away view in axial cross-section through a filter in accordance with the invention shown installed in the tube of a steam condenser inlet water box.
Figure 3:
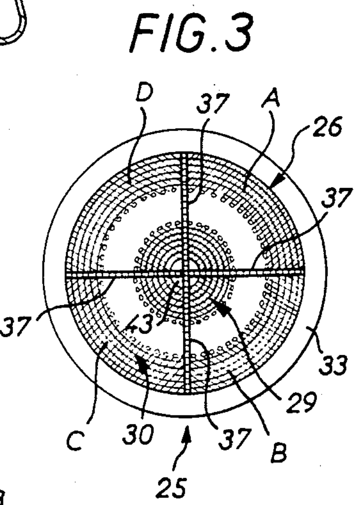
FIG. 3 is a view of the filter in transverse cross-section on the line III—III in FIG. 1 and to a different scale.
Figure 2:
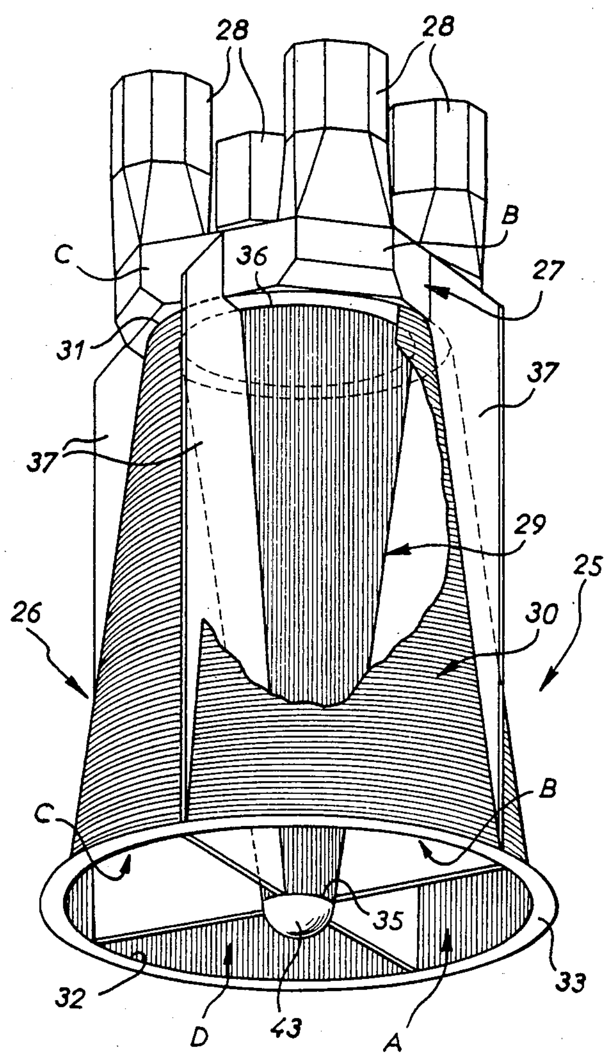
FIG. 2 is a partially cut away perspective view to a larger scale of the filter shown in isolation.
Figure 4:
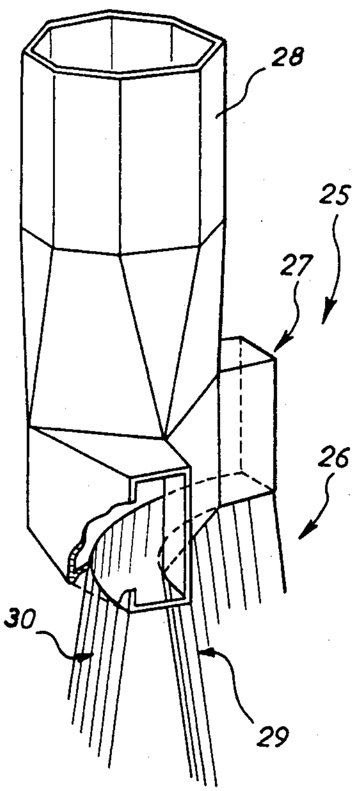
FIG. 4 is a locally cut away partial perspective view of the filter to a different scale, showing in particular one of the sectors constituting the collection space that it comprises.

Also, only part of it has been shown in FIG. 1.

FIG. 1 shows the water box 11 forming the inlet to the steam condenser 10, at the level of the tubular plate 12 of the condenser.

The water box 11 comprises a tube 14 for connecting it to the feed conduit 13.

As the condut 13 is a vertical conduit emerging from the service floor 15 above which the steam condenser 10 is located the tube 14 is at the base of the water box 11 and extends vertically downwards towards the service floor 15.

In the usual way the tube 14 comprises at its free end a connecting flange 16 and, starting from this flange, a first section 17 that is substantially cylindrical like the conduit 13 and a second section 18 that is substantially frustoconical, widening towards the base of the water box 11, through which it is connected to the latter.

Between the conduit 13, which itself has a connecting flange 20 at the end, and the tube 14 of the water box 11 there is disposed, as schematically represented in FIG. 1, a device 21 adapted to absorb any expansion of the tube 14 and itself having connecting flanges 22, 23 by means of which it is inserted between the tube and the conduit 13.

Thus the amount of space available between the water box 11 and the service floor 15 is particularly restricted.

According to the invention, since a filter has to be provided in and event, it is installed inside the tube 14.

The filter is generally designated by the reference number 25 in the figures.

The filter 25 employed is of the kind comprising a filter screen 26 which is to be inserted into the flow of fluid to be treated and which comprises, as will emerge hereinafter, at least one substantially conical filter wall with, at its larger diameter end, a transverse collection space 27 to which is connected at least one offtake conduit 28.

According to the invention, in addition to this first or inner filter wall 29, which extends axially in its central part, the screen 26 of the filter 25 comprises a second or outer filter wall 30 which is frustoconical and disposed around the outside of the first wall, being connected to the collection space 27 that it shares with the first wall by its smaller diameter end 31.

At the larger diameter end 32 of the outer filter wall 30 the screen 26 comprises a flange 33 projecting radially away from its axis and which, to secure the screen, is inserted between two flanges of the installation concerned, in this instance between the connecting flange 16 of the tube 14 of the water box 11 and the upper connecting flange 22 of the expansion device 21.

The larger diameter end 32 of the outer filter wall 30 is complementary to the cylindrical section 17 of the tube 14 and through this larger diameter end 32 it adjoins internally to the tube, in line with the connecting flange 16.

As a result, the screen 26 of the filter 25 installed in this way into the tube 14 of the water box 11 extends axially into the latter from its connecting flange 16.

The inner filter wall 29 and the outer filter wall 30 of the screen 26 have the same axial height which is slightly less than that of the tube 14 of the water box 11.

The inner filter wall 29 of the screen 26 extends from a smaller diameter end 35 which, in the transverse direction, is level with the larger diameter end 32 of the outer filter wall 30 and therefore level with the flange 33 of the assembly, to a larger diameter end 36 which, in the transverse direction, is level with the smaller diameter end 31 of the outer filter wall 30 and at which it is connected to the collection space 27 that is shares with the latter.

The inner filter wall 29 and the outer filter wall 30 of the screen 26 have substantially the same cone angle.

Their half-angle at the apex may be in the order of 5° to 15°, for example, and preferably in the vicinity of 10°.

It is to be understood that these values are given by way of non-limiting example only.

The screen 26 of the filter 25 is circumferentially subdivided to form a plurality of sectors by baffles 37 which each extend radially from the axis of the screen 26 to its periphery, passing through the inner filter wall 29 and the outer filter wall 30, the baffles together forming a support framework for the screen 26.

There are four baffles 37 in a cruciform configuration and thus four sectors A, B, C, D of the screen 26, each subtending an angle of 90°.

Each baffle 37 extends radially beyond the outer filter wall 30 of the screen 26, the envelope at the outside of the assembly being substantially complementary to the inside volume of the cylindrical section 17 of the tube 14 of the water box 11.

In other words each of the longitudinal free edges of a baffle 37, which is parallel to the axis of the assembly, adjoins the cylindrical section 17 of the tube 14 and diverges from the outer filter wall 30 of the screen 26 from its larger diameter end 32.

The baffles 37 are appropriately fastened together along the axis of the assembly, as by welding, for example, and each is individually fastened to the flange 33.

Two of the baffles 37 may be in one piece, for example, together forming a single plate, with the other two being butt-jointed to them along the corresponding edge on the median line of the aforementioned plate.

For each of the sectors A, B, C, D of the screen 26 the inner filter wall 29 and the outer filter wall 30 are each formed by a filter panel extending circumferentially, along the arc of a circle, from one to the other of the baffles 37 delimiting the corresponding sector A, B, C, D.

Before they are curved to their final shape, each filter panel has the shape of an isoceles trapezium with circular bases, and they may all be cut from the same filter material, for example.

In FIG. 1, each is formed by an array of filaments or blades 40 attached to transverse support bars 41, as by welding, for example.

In the usual way the filaments 40 from which these panels are made are preferably profiled so as to have a substantially triangular transverse cross-section with a plane surface directed upstream and the apex directed downstream relative to the direction of circulation of the flow through the corresponding filter walls 29, 30.

These panels are preferably cut out from the original filter material in such a way that the filaments 40 that they comprise are parallel to their median generatrix.

Thus the filaments 40 are all disposed either in radial planes, in the case of those corresponding to a median generatrix, or in planes parallel to these radial planes, in the case of the others.

Overall, they all extend in the same direction, which is the axial direction of flow of the liquid to be filtered in the tube 14.

Along their lateral edges the filter panels from which the inner filter wall 20 and outer filter wall 30 of the screen 26 are made are attached, as by welding, for example, to the baffles 37 between which they lie.

At the smaller diameter end 35 of the inner filter wall 29 of the screen 26 there is a hemispherical dome member 43, having the same diameter and projecting upstream, to promote good flow conditions in the liquid to be filtered.

The hemispherical dome member 43 may be perforated or not.

The baffles 37 forming the support framework for the screen 26 of the filter 25 extend axially beyond the screen 26 and thus into the associated collection space 27 so that, like the screen 26, the collection space 27 is subdivided into a plurality of sectors with a separate offtake conduit 28 for each sector.

Thus here the collection space 27 is subdivided into four sectors A, B, C, D each subtending an angle of 90°.

Where the baffles 37 emerge from the collection space 27 their end edge is cut off obliquely to minimize the projection.

The collection space 27 is disposed annularly around the axis of the screen 26 and is accommodated within the water box 11, extending axially and partly inside the water box 11 proper and partly inside the tube 14.

Fabricated from sheet metal, the sectors A, B, C, D that constitute it have an angular contour, as is usual in the boilermaking art, although they closely follow the circular contour of the convergent outlet formed between the inner filter wall 29 and outer wall 30 of the screen 26 where they connect to the collection space 27.

Because of this, the collection space 27 is locally larger in the radial direction than this outlet.

Similarly, where they connect to the collection space 27 the offtake conduits 28 initially have a polygonal contour which then changes to a circular contour as is usual for such conduits.

The offtake conduits leave the water box 11 through one of its walls, its front wall, for example and as shown here, and on each there is provided, outside the water box 11, a valve 52 for shutting it off, such as a quarter-turn valve.

Under normal operating conditions the valves 52 are closed.

As schematically shown by the arrows F in FIG. 1, the flow to be treated enters the annular volume between the inner filter wall 29 and outer filter wall 30 of the screen 26 in the axial direction.

The flow is incident on both of these filter walls at a low angle of incidence corresponding to their cone angle so that, in addition to a normal penetration component, the speed vector has a predominating tangential component relative to the filter walls.

Since, as described above, the filaments 40 constituting the filter panels which form the inner filter wall 29 and outer filter wall 30 all extend in the same direction, the result of this tangential component of the speed vector of the flow and of the surface turbulence induced when it passes through the filter walls is that any debris, detritus or foreign bodies held back by the filter walls are progressively drawn along these, being pushed along by the flow, until they enter the corresponding sector of the collection space 27.

Independently of the fact that, given that they are radially larger than the outlet formed by the inner filter wall 29 and outer filter wall 30 of the screen 26, the component sectors of the collection space 27 form a dead area for debris, detritus or foreign bodies to collect in, which favors their retention in the collection space 27, the speed vector of the flow is sufficient to hold in suspension, against gravity, the debris, detritus and foreign bodies which reach the collection space 27 when, as here, the filter 25 is vertical with the collection space 27 at the top.

By opening the corresponding valve 52 each of the component sectors of the collection space 27 is cyclically purged in sequence with the others.

Opening a valve 52 creates a significant influx of water which, bypassing the flow to be filtered, passes through the screen 26 without passing through either of its filter walls.

The tangential component of the speed vector of the flow is commensurately increased and this increase, together with the increase in surface turbulence, results in stirring up and therefore detachment of the debris, detritus or foreign bodies that may have been held back by either the inner filter wall 29 or the outer filter wall 30 of the screen 26, despite the entrainment process previously described.

Thus all the debris, detritus and foreign bodies held back by the screen 26 are evacuated to the drainage system.

The valve 52 concerned is then closed, and the procedure repeated for the other component sectors of the collection space 27.

The periodic purges thus applied in succession to the various component sectors of the collection space 27 are preferably executed immediately after each other, or at least in very rapid sequence, so that the corresponding sectors of the screen 26 are always and at all times in substantially the same state and so impose substantially constant head losses.

In practise the head losses increase only slightly between two purge cycles because, by virtue of the process previously described, most of the debris, detritus and foreign bodies held back by the inner filter wall 29 and outer filter wall 30 of the screen 26 are not retained by these walls but rather entrained along them to collect in the corresponding sectors of the collection space 27.

The periodical purging operations can therefore be widely spaced, by between one and a few hours, for example, which advantageously reduces the overall consumption of water.

It will be noted that the overall axial dimension of the filter 25 external to the existing installation is reduced in practise to the thickness of the flange 33.

Also, the fact that the collection space 27 that it comprises is immersed in the flow, on the downstream side of the screen 26, far from being a disadvantage results in an advantageous "break-up" of the flow which favours better distribution of the flow between the various tubes on the downstream side through which it passes.

It is to be understood that the present invention is not limited to the embodiment described and shown, but encompasses any variant execution.

Also, although specifically designed for this application to steam condenser inlet water boxes, the invention is not limited to this application but encompasses applications to all other industrial process water conduits.

It will have been noted that the two filter walls of the screen of the filter in accordance with the invention, which are coaxial, have oppositely directed cone angles, the inner filter wall, the smaller diameter end of which faces upstream, diverging towards the collection space that it shares with the outer filter wall, the larger diameter end of which faces upstream and which converges towards the collection space.

I claim:

1. A self-cleaning fluid filter comprising a screen having a substantially conical axially extending inner wall having a large diameter end and a small diameter end, a fluid inlet being located at the small diameter end, and a fluid outlet being located at the large diameter end, means defining a collection space for fluid entrained debris at the large diameter end, a frustoconical axially extending outer wall transversely spaced from and surrounding said inner wall, said outer wall having a smaller diameter end connected to said means defining a collection space and a large diamter end at said fluid inlet, at least one offtake conduit connected to said means defining a collection space for carrying away debris therefrom, and baffles extending through said inner wall and said outer wall and forming a support framework for said screen.

2. Filter according to claim 1, wherein said baffles subdivide said screen circumferentially to form a plurality of sectors, said baffles extending radically from said screen to its periphery.

3. Filter according to claim 2, wherein said baffles extend radially beyond said outer wall.

4. Filter according to claim 2, wherein said baffles extend axially beyond said screen into said means defining a collection space whereby said means defining a collection space is also subdivided circumferentially into sectors, a respective offtake conduit being connected to each of said sectors of said means defining a collection space.

5. Filter according to claim 2, wherein there are four baffles in a cruciform configuration in cross section.

6. Filter according to claim 1, wherein said inner and outer walls have the same axial dimension.

7. Filter according to claim 1, further comprising a radial flange at the larger diameter end of said outer wall and directed away from the filter.

8. Filter according to claim 1, wherein said means defining a collection space is disposed axially beyond said inner and outer walls of said screen.

9. Filter according to claim 1, wherein one annular area between the large diameter end of the inner wall and the small diameter end of the outer wall opens directly into said means defining a collection space.

10. Filter according to claim 1, wherein said inner and outer walls are coaxial.

11. Filter according to claim 1, wherein the filter is devoid of moving parts.

12. Steam condenser inlet water box comprising a tube for coupng the water box to a feed conduit, a self-cleaning water filter disposed in the tube comprising a screen having a substantially conical axially extending inner wall having a large diameter end and a small diameter end, and a fluid outlet being located at the large diameter end, means defining a collection space for water entrained debris at the large diameter end, a frustoconical axially extending outer wall transversely spaced from and surrounding said inner wall, said outer wall having a smaller diameter end connected to said means defining a collection space and a large diameter end at said fluid entrance, at least one offtake conduit connected to said means defining a collection space for carrying away debris therefrom, baffles extending through said inner wall and said outer wall and forming a support framework for said screen.

13. Water box according to claim 12, wherein said tube comprises a mounting flange and said screen of said filter extends axially away from said flange.

14. Water box according to claim 12, wherein said means defining a collection space lies within said water box and said at least one offtake conduit exits said water box through one wall thereof.

15. Water box according to claim 12, wherein said baffles subdivide said screen circumferentially to form a plurality of sectors and said baffles extend radially from said screen to its periphery.

16. Water box according to claim 15, wherein said baffles extend radially beyond said outer wall.

17. Water box according to claim 15, wherein said baffles extend axially beyond said screen into said means defining a collection space whereby said means defining a collection space is also subdivided circumferentially into sectors, a respective offtake conduit being connected to said sectors of said means defining a collection space.

18. Water box according to claim 15, wherein there are four baffles in a cruciform configuration in cross section.

19. Water box according to claim 12, wherein said inner and outer walls have the same axial dimension.

20. Water box according to claim 12, further comprising a radial flange at the larger diameter end of said outer wall and directed away from the filter.

* * * * *